(12) United States Patent
Kootstra et al.

(10) Patent No.: US 7,533,109 B2
(45) Date of Patent: May 12, 2009

(54) ITEM QUEUE MANAGEMENT

(75) Inventors: Lewis S. Kootstra, Roseville, CA (US); Michael S. Vacanti, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 662 days.

(21) Appl. No.: 11/114,253

(22) Filed: Apr. 26, 2005

(65) Prior Publication Data

US 2006/0242338 A1    Oct. 26, 2006

(51) Int. Cl.
G06F 17/30 (2006.01)
G06F 7/00 (2006.01)

(52) U.S. Cl. ........................... 707/101; 707/102
(58) Field of Classification Search .................. None
See application file for complete search history.

(56) References Cited

U.S. PATENT DOCUMENTS

| | | | |
|---|---|---|---|
| 6,094,435 A | 7/2000 | Hoffman et al. | |
| 6,466,580 B1 | 10/2002 | Leung | |
| 6,487,212 B1 | 11/2002 | Erimli et al. | |
| 6,823,062 B2 * | 11/2004 | Kepley | 379/266.06 |
| 6,842,423 B1 | 1/2005 | Erimli et al. | |
| 2002/0023270 A1 * | 2/2002 | Thomas et al. | 725/95 |
| 2002/0188648 A1 * | 12/2002 | Aweya et al. | 709/102 |
| 2003/0123429 A1 * | 7/2003 | Hirota et al. | 370/351 |
| 2003/0177183 A1 * | 9/2003 | Cabrera et al. | 709/204 |
| 2004/0034686 A1 * | 2/2004 | Guthrie | 709/203 |
| 2004/0172274 A1 * | 9/2004 | Gross | 705/1 |
| 2004/0223497 A1 * | 11/2004 | Sanderson et al. | 370/395.52 |
| 2004/0225734 A1 * | 11/2004 | Schober et al. | 709/225 |

* cited by examiner

Primary Examiner—Kuen S Lu

(57) ABSTRACT

Network devices, systems, and methods are provided involving item routing management. One embodiment includes a computing device item routing management having a number of queues and a logic component. The number of queues can hold a number of items to be routed, via a routing path within the computing device, at least one of the items having time information associated therewith. The logic component can review at least one of the number of items held within the queue based upon the time information to determine whether to discard the item.

25 Claims, 5 Drawing Sheets

Figure 3:
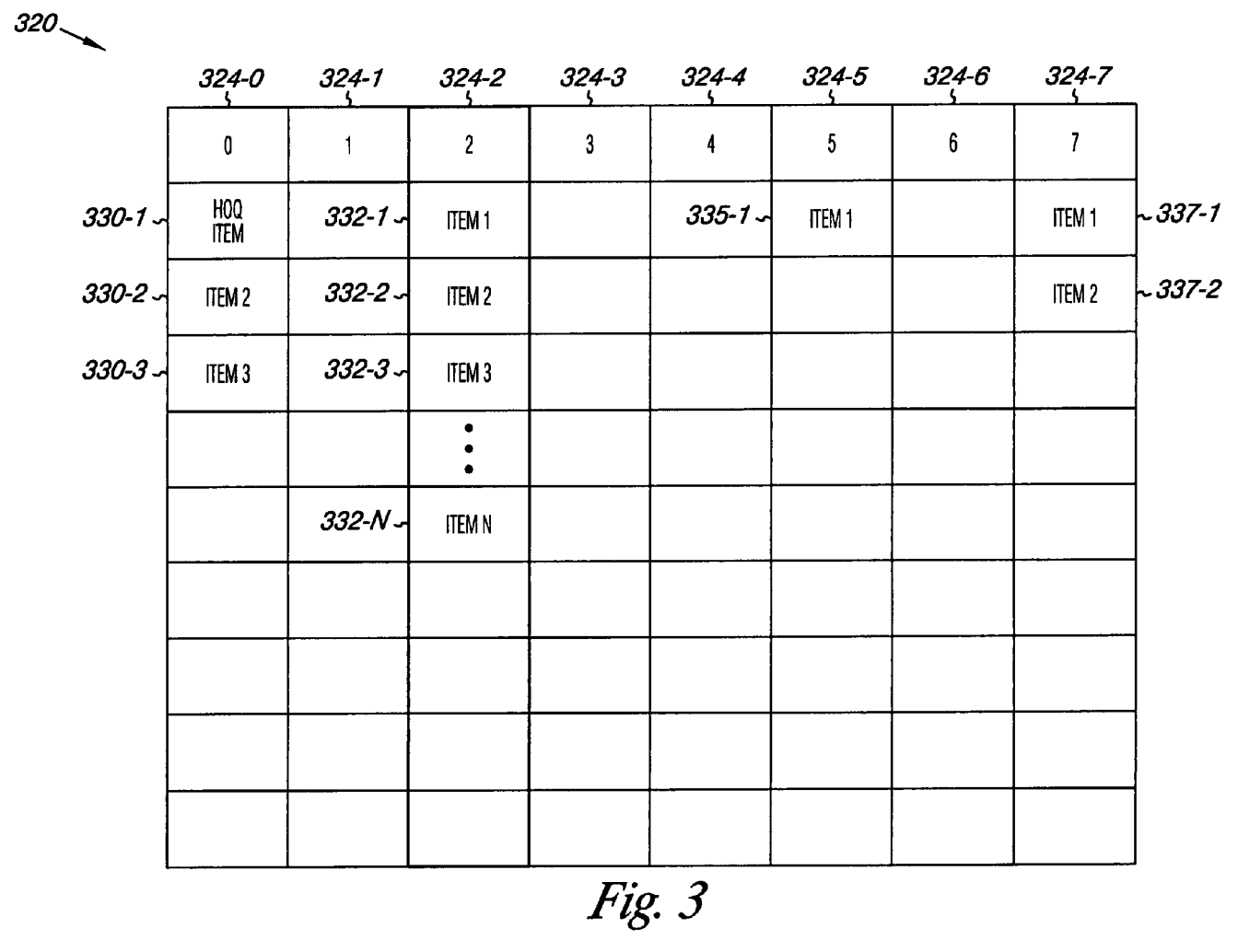

|  | 0 | 1 | 2 | 3 | 4 | 5 | 6 | 7 |
|---|---|---|---|---|---|---|---|---|
| 330-1 | HOQ ITEM | 332-1 ITEM 1 | ITEM 1 |  | 335-1 | ITEM 1 |  | 337-1 ITEM 1 |
| 330-2 | ITEM 2 | 332-2 ITEM 2 | ITEM 2 |  |  |  |  | 337-2 ITEM 2 |
| 330-3 | ITEM 3 | 332-3 ITEM 3 | ITEM 3 |  |  |  |  |  |
|  |  | 332-N | ITEM N |  |  |  |  |  |
|  |  |  |  |  |  |  |  |  |
|  |  |  |  |  |  |  |  |  |
|  |  |  |  |  |  |  |  |  |
|  |  |  |  |  |  |  |  |  |

Columns labeled 324-0 through 324-7.

ITEM QUEUE MANAGEMENT

BACKGROUND

Internal to many computing devices (e.g., networking devices and/or components such as switches, routers, etc.) there is often one or more queues responsible for holding items, such as packets of information, and other types of information that are used in the network computing device's global operation. A queue is used during the routing of information held in a queue until a forwarding resource is available. For example, queues are used to hold information, such as computer executable instructions and/or data, waiting to be processed by a processor. Queues are also used to hold information waiting to be routed to and/or from a network conduit port provided on a computing device.

Typically, these queues use a First-In-First-Out (FIFO) structure for the processing of the information as it is being routed. A FIFO routes each item in the order in which it was received, so the first item in is the first item out. However, such logic structures associated with routing such items often do not provide proper throughput for timely processing of items. In such cases, an item may, for example, be waiting for a long period of time while a number of other items are being routed and thereby, the time period for action on the item may have passed.

Also, in some devices and systems, these expired items are discarded when they exit the queue and, therefore, the expired items sit in the queue in front of items that have not expired and time is expended in determining that an item has expired and discarding of the item. Alternatively, the item is forwarded after it has expired and the destination does not know how to handle it because it no longer has a use for the information or the information is inaccurate at this point in time.

BRIEF DESCRIPTION OF THE DRAWINGS

FIG. 3 illustrates the items waiting in the information processing structure of FIG. 2.

DETAILED DESCRIPTION

Embodiments of the present invention provide a queue structure for routing of information, such as to and from a processor responsible for processing the information, or other such sources and destinations in a computing device's operation. Embodiments of the present invention allow for management of the processing of the items based upon the age of the item.

For example, a computing device can include a routing path for exchanging a number of items each having a time stamp associated therewith. The routing path can have a queue structure having a number of queues associated therewith to hold a number of items.

A logic component can also be associated with the routing path to review each of the number of items to determine whether to discard the item. The logic component can include computer executable instructions written in software or firmware code and/or instructions provided by hardware, such as with a number of logic gates in an application specific integrated circuit (ASIC), a state component, or other such hardware based logic component or device. Accordingly, logic components can include components having processors and memory and/or state machines for providing one or more discard processes, such as those exemplary embodiments discussed herein.

In some embodiments, the determination of whether or not to discard an item can be based upon an evaluation of the time stamps of one or more of the items being held in a queue. For example, time stamps can be compared to a general threshold time period applied to all items, to a time threshold for items of a particular classification, to a time threshold for items within a particular queue, to each other to determine whether one item should be processed before another, among other methods of determination.

Embodiments can also use the time stamp information in conjunction with other criteria in determining whether an item should be discarded. For example, in some embodiments, the time stamp information can be used with classification information, such as whether the item is in a loss tolerant format, such as a Transmission Control Protocol (TCP) packet, or a less loss tolerant format, such as an Internet Protocol (IP) Telephony packet, among other such item formats and/or classification criteria.

Once a discard determination is made with regard to a particular item, the discard can be accomplished, such as by discarding the item or marking the item for discard, and the discard determination process can then be applied to another item. Such an evaluation can be made before an item enters a queue, when the item is waiting in the queue, and/or can be made when an item exits a queue, for example. In various embodiments, the discard process can be a part of the computer executable instructions that provide the routing path structure or can be part of the queuing structure.

Figure 1:
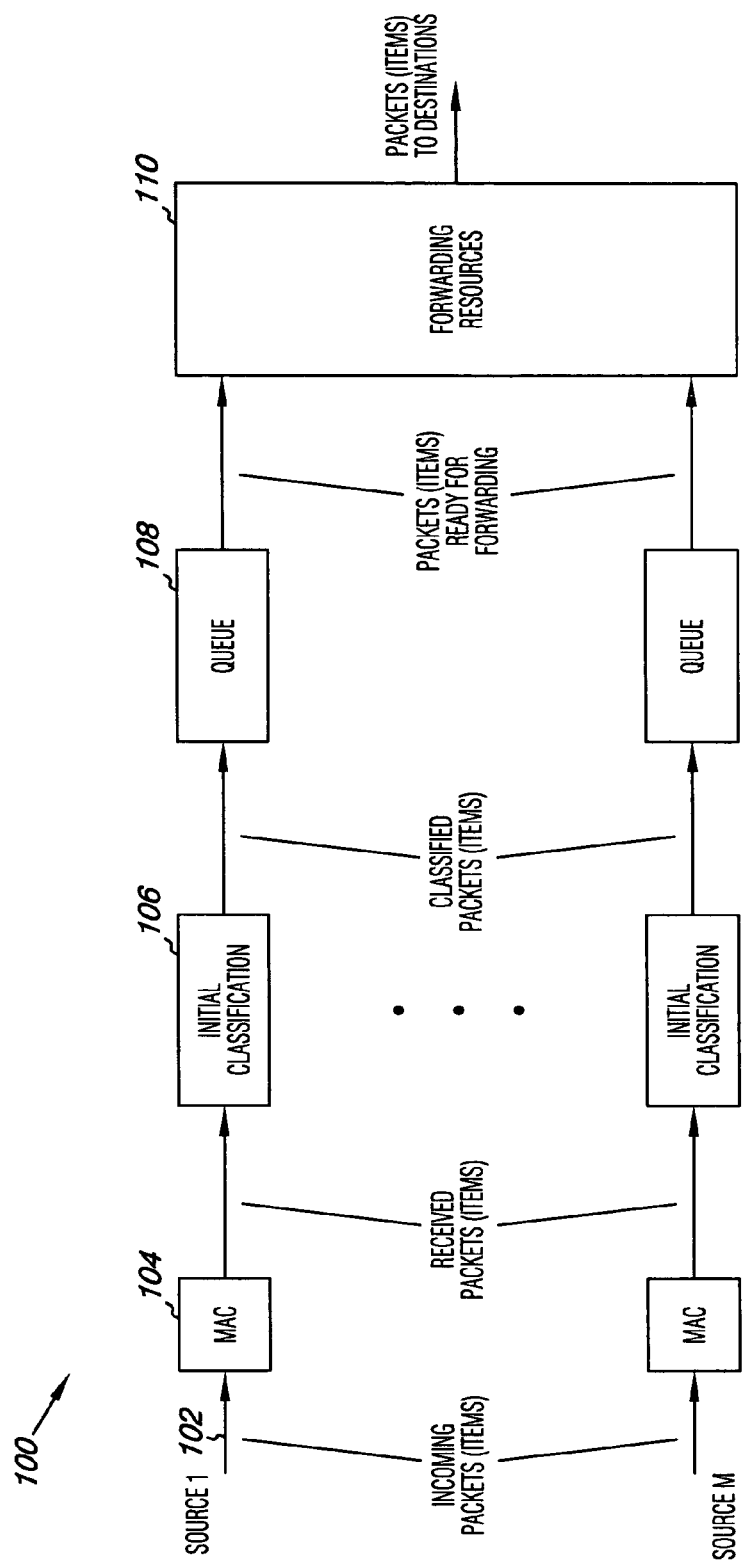
FIG. 1 is an embodiment illustrating a number of information processing paths within a networking device.

FIG. 1 is an embodiment illustrating a number of item processing paths within a networking device. In this embodiment, a networking device 100 receives incoming items 102 (e.g., in this example packets) from a number of sources (e.g., source 1 and source M, in this example). The incoming packets are routed to a Media Access Controller (MAC) 104 which can be used to receive and route the packets to an initial classifier 106 where each packet is classified.

In such embodiments, the classification process can include a number of different types of information that can be determined about the packet. For example, the type of subject matter of the packet can be determined (e.g., whether the packet is a: Transmission Control Protocol (TCP) packet, web traffic packet, File Transfer Protocol (FTP) packet, Internet Protocol (IP) Telephony packet, etc.). This information can be used to assign a level of priority for the packet. Time information, such as a time stamp, can also be applied to an item during the classification process.

The assignment of time information can be used to indicate a preference with respect to which items to discard. This time information concept can be useful where a number of items are waiting to be acted upon in a queue structure. In such embodiments, various suitable numbers of threshold levels and other such criteria can be used to determine whether or not to discard an item.

The time information can be provided at various times during the processing of an item, can be provided in various forms with respect to the item being routed, and can come in various formats. For example, the time information can be provided during the initial classification process, as discussed above, or at some other point in the routing process.

Additionally, the time information can be provided with the item in various suitable manners. In this respect, the time information can, for example, be provided in a header of the information being routed. The time information can be provided with various other types of information, such as with classification and/or priority information, among others.

Further, the format of the time information can be provided in various manners. For example, in some embodiments, the time information can be in the form of a one, two, or three bit value that is associated with the time information (e.g., provided in the header of the packet, etc). In such embodiments, the time information then travels with the item, as the item is routed through the computing device. This time information can, in some embodiments, travel with an item through a queue structure.

With regard to the embodiment illustrated in FIG. 1, once the item has been classified, the classified item is routed to a queue 108 where it is held until it can be routed to a forwarding resource 110 for forwarding to a processor or other destination. In the embodiment shown in FIG. 1, items can be routed through parallel paths from source 1 through source M. However, the embodiments of the present invention are not so limited.

For example, other routing structures include, but are not limited to, a single path for use by a number of sources from source 1 through source M can be provided in some embodiments. In various embodiments, paths can be defined for each, or a number of, item protocol types. In this way, the items can be separated and can, in some cases, be classified and prioritized based upon the path on which the item is routed.

Figure 2:
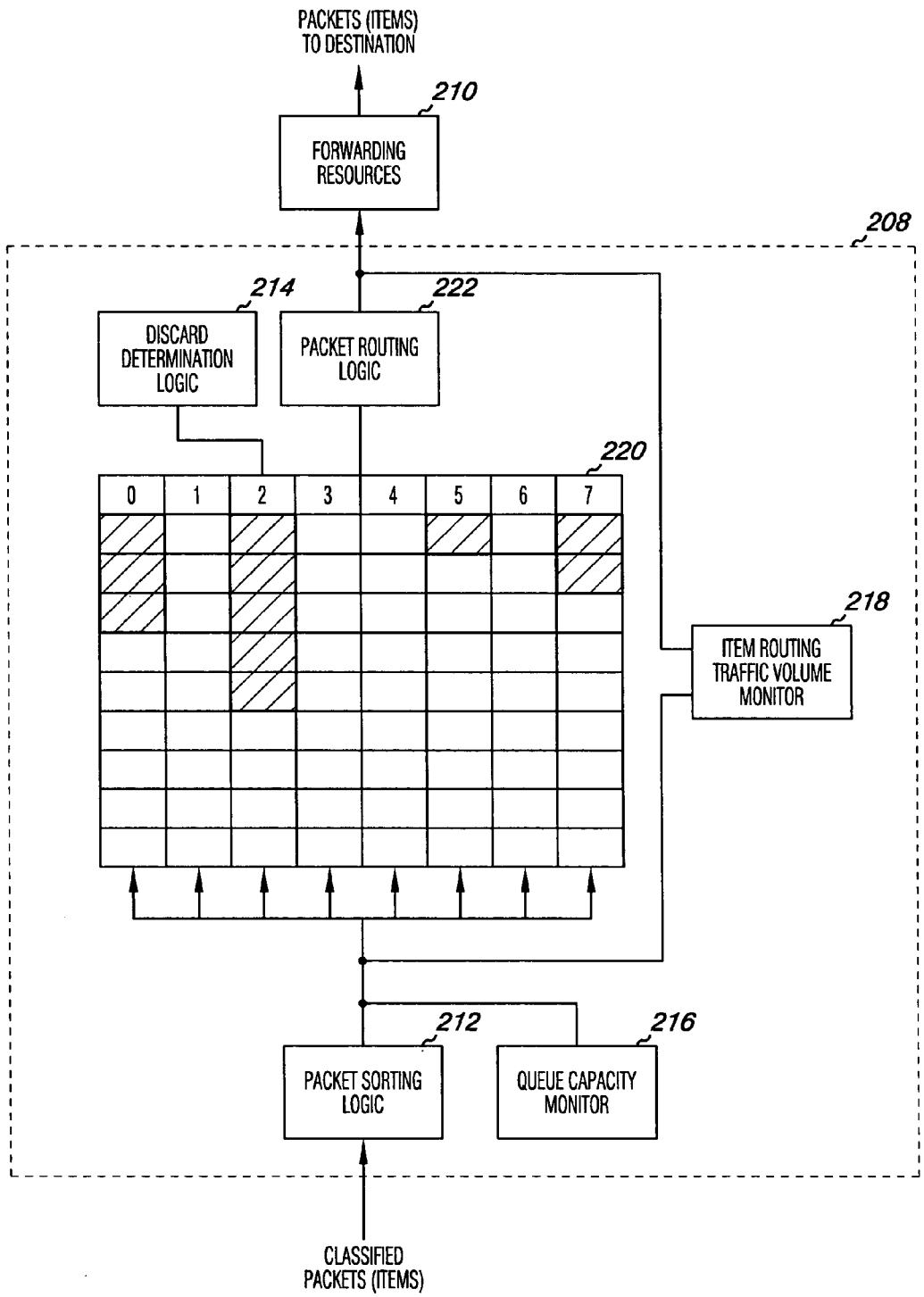
FIG. 2 illustrates an embodiment of an information processing structure.

FIG. 2 illustrates an embodiment of an information processing structure. The embodiment of FIG. 2 could, for example, be used as a queue 108, described in FIG. 1.

In the embodiment of FIG. 2, a queue structure 208 for holding a number of items (e.g., packets) is illustrated. In this embodiment, the queue structure 208 receives classified packets and holds them until they can be forwarded, in this embodiment via the packet routing logic 222, to the forwarding resources 210 for further processing and/or for forwarding to a destination. The forwarding resources 210 can then route the packet to its destination. In some embodiments, the packet routing logic 222 can also include logic to determine whether or not to discard an item prior to forwarding the item to the forwarding resources 210.

In the embodiment of FIG. 2, the queue structure 208 includes packet sorting logic 212, a queue capacity monitor 216, discard determination logic 214, among other components. The packet sorting logic can be used to distribute the various incoming packets (i.e., classified packets (items)) into a number of queues 220. The queue structure 208 includes 8 queues numbered 0 to 7.

In some embodiments, the queues 220 can be assigned a priority and items that have a priority corresponding to the priority of the particular queue can be placed therein. In this way, high priority items can all be arranged together and thereby, in some instances, the computing device can focus on selecting items from the high priority queue in preference to items in the other lower priority queues. In the embodiment shown in FIG. 2, queue number 7 has been designated as the highest priority queue, while queue number 0 has been designated as the lowest priority queue.

As stated above, in various embodiments, other criteria can be used to organize the items in the various queues. For example, classifications, format types (e.g., various levels of loss tolerance), etc. can be other criteria that can be utilized.

In the embodiment shown in FIG. 2, the queue structure includes a number of monitoring components that can be used to monitor the flow of information into and through the queue structure 208. For example, a queue capacity monitor 216 can be used to monitor the number of items within one or more of the queues 220.

These monitoring components and the information derived therefrom can be used for a variety of functions. In some embodiments, for instance, the queue capacity monitor 216 can monitor the total number of items entering the queue. Such information can also be monitored over time and can also be benchmarked against various thresholds. For example, preset thresholds can be established to indicate at what rate items should be discarded. The amount of space remaining in the queue, when measured over a period of time, can also be used to determine how quickly the queue is filling up and/or how much time may be remaining until the queue is full based upon the current rate of items entering the queue.

An item routing traffic volume monitor 218 can be used to provide a variety of information. For example, the item routing traffic volume monitor can indicate the throughput of the queuing structure 208. The information provided from this monitor (e.g., in the form of a routing path traffic volume indicator, for example) can also be used to determine a wait time for one or more of the individual queues and/or for the queue structure as a whole. For example, the item routing traffic volume monitor 218 can be designed to identify when a particular item enter the queue and leaves the queue. This information can be used to establish how long the item waited in the queue.

Additionally, if the priority information is available, the item routing traffic volume monitor 218 can also provide information to identify how long an item from a particular queue is waiting to be processed through the queue structure. This information can then be used to identify which queues are moving quickly and which are moving slowly. This information can aid in determining which queues, should be selected for review with regard to discarding items that have expired.

Further, information from one or more monitors can be used to determine how long a wait is in a particular queue based upon the number of higher priority items ahead of the particular item in the queue structure. For example, in FIG. 3, if the queue structure is selecting items based upon priority, it will select the two highest priority items in queue 7 first, then the next highest priority item next, in this case the item in queue 5, and so on down to queue 0.

Information provided by one or more monitors can be used to determine the timeframe in which a particular item may be selected for processing. For example, the higher priority items may each take a ⅛ second tick to be selected and processed, while the item in queue 5 may take ¼ second to be selected and processed. Accordingly, the item at the head of the queue in queue 2 can expect a wait of ⅜ second ticks before item will likely be selected and processed. This time calculation can be used to determine whether that wait will be too long for the particular item to be processed, among other such functions in which the information can be used.

Information, regarding into which queues items are being placed, can also be monitored by one or more monitors. This information can be used to identify queues that are inactive (i.e., empty queues), and queues that are active (i.e., queues having one or more items). In the example provided in FIG. 2, queues 7, 5, 2, and 0 are active, and queues 6, 4, 3, and 1 are inactive. This information can be used to limit the queues that are to be reviewed for items to be discarded and/or items that are to be selected for processing.

The review of items to be discarded can be accomplished in a number of ways, as discussed above. In the embodiment shown in FIG. 2, a discard determination logic component 214 is provided. This component can be used to review one or more items and/or one or more queues, to determine and select items to be discarded.

In the embodiment shown in FIG. 2, the discard determination logic component 214 is reviewing the time information of the items within queue number 2 to determine if any of the items therein should be discarded. For example, the discard determination logic component 214 can review a time stamp and determine whether too much time has past, or will pass by the time the item is selected for processing, and therefore the item should be discarded.

One or more monitors, such as those described in FIG. 2, can also be used to provide time information. For example, a monitor can be used to determine the length of time an item has been waiting in the queue. This information can be used to determine whether or not the item should be discarded.

In some of the embodiments discussed above, the time information regarding the time the item has been waiting or the time the item was assigned particular time information (e.g., time since a time stamp was associated with the item) can be compared to other time information to determine whether or not to discard an item. For example, time information can be compared to a current clock value or to predetermined length of time information. This information can be stored in memory, in software, firmware, and/or hardware.

Additionally, in some embodiments, a clock associated with a computing device can utilize a wrapping function wherein it counts through a sequence of values and then, upon reaching the end of the sequence, starts over at the beginning of the sequence. Often times, in such wrapping systems, time information can be provided using the values of the sequence as reference points. However, if the clock wraps around, the time period will appear shorter than it actually is, since the clock has started over. In such embodiments, the review of the various items to be discarded can be accomplished before the clock wraps around. In this way, the age of the items can be determined correctly and the items can be discarded appropriately.

FIG. 3 illustrates the items waiting in the queue structure illustrated in FIG. 2. In this embodiment, the queues 320 have been assigned priority levels and are individually identified from lowest to highest as 324-0 through 324-7. Items that have a correlating priority level (e.g., as provided in its associated priority information) have been placed in the queue that correlates with the item's priority level. In queue 324-0 (i.e., the lowest priority queue) three items are present (i.e., 330-1, 330-2, and 330-3). The first item in each queue (i.e., 330-1, 332-1, 335-1, and 337-1) can be referred to as the item at the head of the queue (item 330-1 is labeled HOQ, as an example, to designate its place at the head of the queue 324-0) and, as such, will be the first item to be selected from its particular queue.

As well as indicating that the item is the next to be selected from a particular queue, information about the head of the queue can be useful for various purposes. For example, in some embodiments, the wait time information of an item at the head of the queue can be compared with the time information of an incoming item to determine if the incoming item should enter the queue or queue structure or whether it will expire before it gets selected and therefore should be discard before it even enters the queue or queue structure.

As discussed above, if priority is used to determine which queue to select items from first, then queue 324-7 will be designated to be accessed first. Once a queue is emptied, logic can determine which queue has the next lowest priority and/or which active queue has the next lowest priority. In such embodiments, the items in the lowest priority queue 324-0 will be the last to be selected and, accordingly, this queue 324-0 would likely be chosen to begin the review of items to be discarded. As discussed above, the discard process can be designed to discard items that have expired or with expire by the time they are selected, for example.

In some embodiments, such as that shown in FIG. 3, the available space in a queue can be used to determine which queue should be reviewed for items to be discarded. In the embodiment of FIG. 3, queue 324-2 has more items (i.e., 332-1 through 332-N) than the other queues and may be nearing its capacity. In such an embodiment, the items in the queue can be reviewed to see if any of the items near the head of the queue can be discarded to make room for incoming items. In this way, the items in the higher priority queues may all be processed and the queue 324-2 can have been cleared of expired items so that the incoming items can be timely selected for processing.

Figure 4:
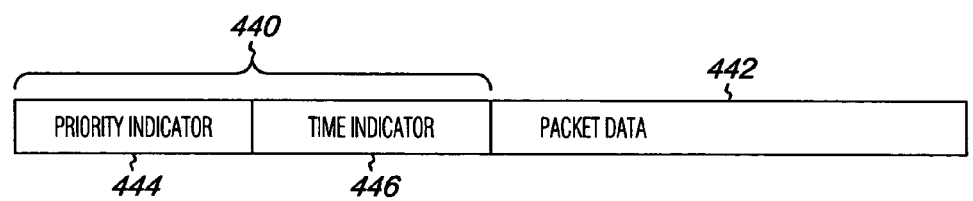
FIG. 4 illustrates an example of how information can be provided by an item of an embodiment of the present invention.

As stated above, various type of time information can be provided. Additionally, the time information can be provided in various formats and can be associated with the item in various ways. FIG. 4 provided one suitable example for associating the time information with the item.

FIG. 4 illustrates an example of how information can be provided by an item of an embodiment of the present invention. Those of ordinary skill in the art should understand from reading this disclosure that this is one of many methods that can be used to provide priority and time information, and packet data; and that the embodiments of the present disclosure are not limited to the illustrated example.

In the embodiment of FIG. 4, the item is a packet which includes packet data 442. The packet also includes a header 440. The header 440 can include a variety of information therein.

For example, the header can include a priority indicator 444. The priority indicator 444 can be used to identify into which queue the item is to be placed and can also be used to provide information on how the information is to be treated in view of items of other levels of priority.

The header can also include classification information for example, for determining the type or format of the information. This information can be used to identify the time periods that are relevant with respect to the item, and whether the item should be discarded (e.g., level of loss tolerance).

A time indicator can also be provided in the header, such as in the embodiment of FIG. 4. In this embodiment, the time indicator 446 is provided after the priority indicator so that the priority can be identified (e.g., and provided to packet sorting logic 212 in the embodiment of FIG. 2) and then the time information can be provided, for example, to discard determination logic (e.g., discard determination logic component 214) and/or one or more monitors (e.g., queue capacity monitor 216 and/or item routing traffic volume monitor 218 of the embodiment of FIG. 2).

Figure 5:
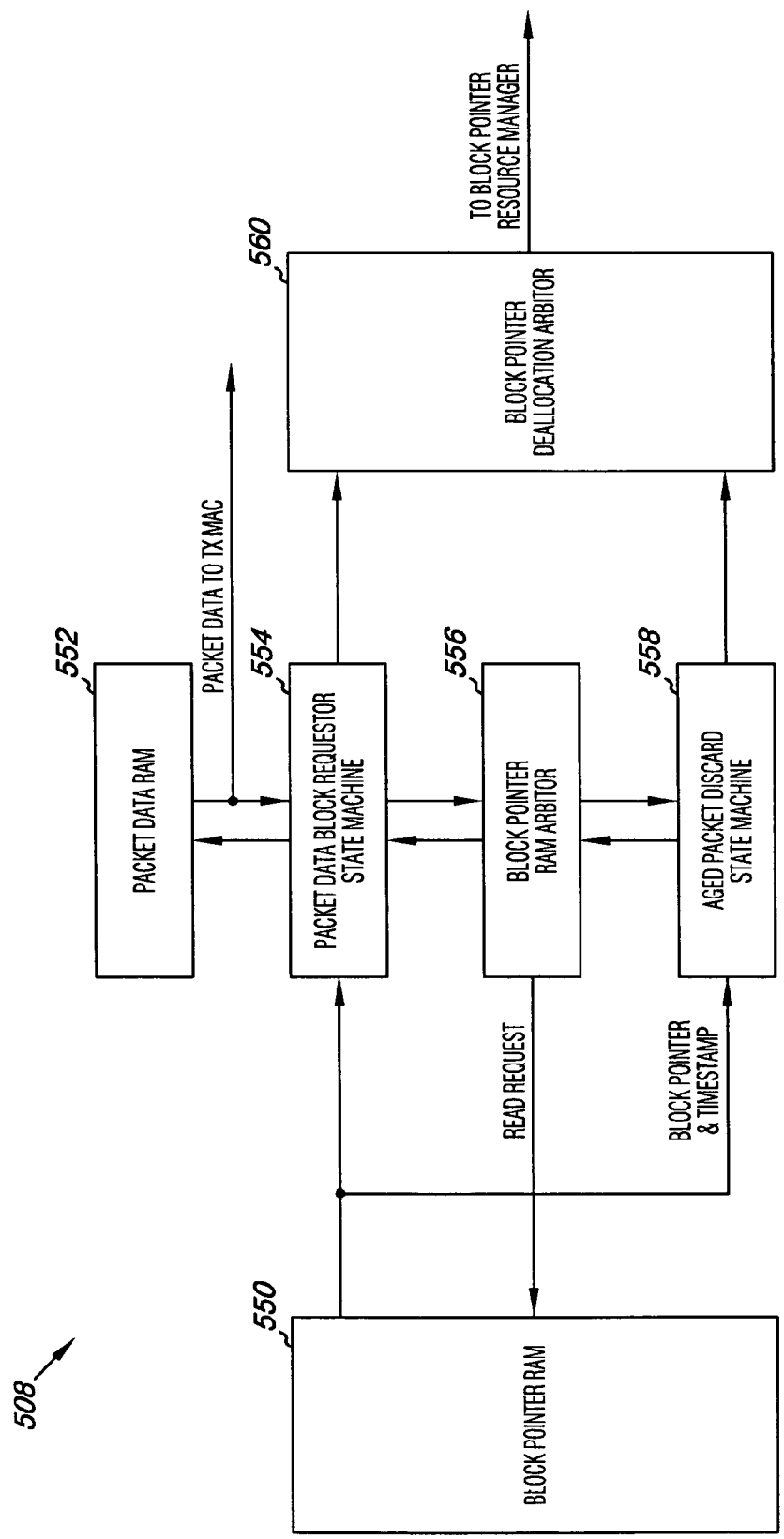
FIG. 5 illustrates an example of the flow of information of an embodiment of the present invention.

FIG. 5 illustrates an example of the flow of information of an embodiment of the present invention. As stated above, the routing of information in the various embodiments disclosed herein can be accomplished in various manners. The embodiment shown in FIG. 5 illustrates one such suitable manner.

The embodiment of FIG. 5 illustrates a queue structure 508 that utilizes random access memory (RAM) and state components (e.g., packet data block requestor state machine 554 and aged packet discard state machine 558) to determine which packets to discard. The embodiment shown in FIG. 5 allows for packets to be discarded in parallel with the operation of the packet routing process. The packet data block requestor state machine 554 can be used in the routing of packets during the queuing and dequeuing processes.

In this way, items can be discarded without slowing or disrupting the packet routing process. In the embodiment of FIG. 5, items (e.g., packets) are held in the packet data RAM 552. When a packet is selected for processing, the packet data is forwarded (e.g., packet data to TX MAC). In order to determine if a packet is to be discarded, a packet has to be identified for review.

To accomplish this, the block pointer RAM arbiter 556 provides a read request to the block pointer RAM 550. The block pointer RAM 550 provides a pointer to a particular queue within the packet data RAM 552. The block pointer and time information is provided to an aged packet discard state machine 558.

This component reviews the time information and determines whether the packet should be discarded. If it is determined that the packet should be discarded, the discard request is communicated to the block pointer RAM arbiter 556 and the block pointer de-allocation arbiter 560.

The aged packet discard state machine 558 fetches the pointer that points to the block of data to be discarded. The pointer to the data to be discarded is deallocated by the aged packet discard state machine 558. The deallocation is communicated to the block pointer resource manager via the block pointer deallocation arbiter 560.

This allows the deallocated pointer to be reallocated to an incoming item to be placed in a queue. In this way, the discard process (e.g., via the aged packet discard state machine 558) can take place in parallel with items being routed through another queue, such as one with a higher priority (e.g., via the packet data block requestor state machine 554). Such embodiments, therefore, do not impede the flow of the routing of items through the queue, since they are discarded in parallel.

By using state components, the computing device can continue routing items through a queue structure while at the same time removing items that have expired. Such embodiments can, therefore reduce latency because they have removed expired items prior to the expired item being selected and then subsequently discarded.

Although specific embodiments have been illustrated and described herein, those of ordinary skill in the art will appreciate that an arrangement calculated to achieve the same techniques can be substituted for the specific embodiments shown. This disclosure is intended to cover adaptations or variations of various embodiments of the invention.

It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the invention includes other applications in which the above structures and methods are used. Therefore, the scope of various embodiments of the invention should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the invention require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device, comprising:
    multiple queues, each queue provided to hold a number of computing device operational items to be routed, via one or more routing paths within the computing device, at least one of the number of items having time information associated therewith;
    a hardware based logic component having executable instructions to:
        review at least one of the number of items held within one of the multiple queues based upon the time information of at least one of the number of items having time information to determine whether to discard a particular item of the number of items to be routed; and
        wherein the executable instructions for reviewing each of the number of items includes defining a length of time for action on the particular item and reviewing the time information of at least one of the number of items having time information to determine whether the length of time for action has passed or will pass while the item is in the queue in which it is positioned and therefore the item should be discarded.

2. The computing device of claim 1, wherein the hardware based logic component reviews the particular item in one queue to determine whether to discard the item while the computing device selects another item from another queue for routing.

3. The computing device of claim 2, wherein the hardware based logic component is designed such that the determination of whether to discard the item does not impede the selection of the item for routing.

4. The computing device of claim 1, wherein each of the multiple queues hold items of a different priority level including at least one high priority and at least one lower priority queue and wherein the hardware based logic component reviews a particular item in the at least one lower priority queue to determine whether to discard the item.

5. The computing device of claim 1, wherein the hardware based logic component determines which of the number of items to discard prior to the wrapping of a clock on the computing device.

6. The computing device of claim 1, wherein the hardware based logic component reviews at least one of the number of items by comparing the time information of a particular item to be discarded with a number of time thresholds that are based upon a priority of a particular item.

7. The computing device of claim 1 wherein the hardware based logic component reviews at least one of the number of items by a comparison of time information for an item at the head of a particular queue and an incoming item.

8. The computing device of claim 1, wherein the hardware based logic component determines whether to discard a packet based upon the time information and a priority indicator.

9. A computing system, comprising:
    a number of routing paths for routing a number of computing device operational items, each item having time information associated therewith;
    multiple queues associated with the number of routing paths for holding the number of items;
    a hardware based logic component having executable instructions for reviewing at least one particular item of the number of items to determine whether to discard the item based upon the time information associated therewith; and wherein the executable instructions for reviewing the particular item includes defining a length of time for action on the particular item and reviewing the time information the particular item to determine whether the length of time for action has passed or will pass while the particular item is in the queue in which it is positioned and therefore the particular item should be discarded.

10. The computing system of claim 9, wherein the executable instructions for reviewing each of the number of items includes defining a time period for action on a particular item and reviewing the time information to determine whether the time period for action has passed.

11. The computing system of claim 9, wherein the executable instructions are of a type selected from the group including: software instructions, firmware instructions, and hardware instructions.

12. The computing system of claim 9, wherein the executable instructions for reviewing each of the number of items includes defining a time period for action for a particular item classification and reviewing the time information to determine whether the time period for action has passed.

13. The computing system of claim 9, wherein the executable instructions for reviewing each of the number of items includes defining a time period for action for a particular item priority level and reviewing the time information to determine whether the dine period for action has passed.

14. The computing system of claim 13, wherein the determination of whether to discard the item is also based upon a routing path traffic volume indicator.

15. The computing system of claim 13, wherein the executable instructions for reviewing each of the number of items to determine whether to discard the item includes executable instructions for comparing time information associated with an incoming item with time information of an item at the head of the queue to determine if either should be discarded.

16. A method for managing computing device operational items on a computing device, comprising:

holding a number of computing device operational items in one or more of multiple queues, each item having time information associated therewith;

reviewing at least one particular item to determine whether to discard the particular item based upon the time information associated therewith; and wherein the executable instructions for reviewing the particular item includes defining a length of time for action on the particular item and reviewing the time information the particular item to determine whether the length of time for action has passed or will pass while the particular item is in the queue in which it is positioned and therefore the particular item should be discarded.

17. The method of claim 16, wherein reviewing each of the number of items includes reviewing each item in a first queue to determine whether to discard the item based upon the time information associated therewith.

18. The method of claim 17, wherein reviewing each of the number of items includes reviewing each item in a second queue to determine whether to discard the item based upon the time information associated therewith.

19. The method of claim 16, wherein the method further includes determining a particular item to process based upon a level of priority assigned to each particular queue.

20. The method of claim 16, wherein the method further includes selecting a first queue based upon an assigned priority level, removing an item from the selected queue for processing, and selecting a second queue from which an item is to be discarded.

21. A computer readable storage medium encoded with a set of computer executable instructions stored thereon that execute to cause a device to perform a method, comprising:

holding a number of items in one or more of multiple queues, each item having time information associated therewith;

reviewing at least one particular item to determine whether to discard the particular item based upon the time information associated therewith; and wherein reviewing the particular item includes defining a length of time for action on the particular item and reviewing the time information the particular item to determine whether the length of time for action has passed or will pass while the particular item is in the queue in which it is positioned and therefore the particular item should be discarded.

22. The medium of claim 21, wherein the method further includes selecting one or more particular queues, from the number of queues, from which to review the number of items therein for discard.

23. The medium of claim 21, wherein the method further includes restricting the number of queues being accessed to select items to be processed.

24. The medium of claim 21, wherein the method further includes monitoring active and inactive states for each of the number of queues and selecting the queues having an active state to select items for processing and discard.

25. The medium of claim 21, wherein the method further includes monitoring active and inactive states for each of the number of queues and removing the queues having an inactive state from the processes of selecting items for processing and discard.

* * * * *

UNITED STATES PATENT AND TRADEMARK OFFICE
CERTIFICATE OF CORRECTION

| | | |
|---|---|---|
| PATENT NO. | : 7,533,109 B2 | Page 1 of 1 |
| APPLICATION NO. | : 11/114253 | |
| DATED | : May 12, 2009 | |
| INVENTOR(S) | : Lewis S. Kootstra et al. | |

It is certified that error appears in the above-identified patent and that said Letters Patent is hereby corrected as shown below:

In column 8, line 52, in Claim 7, delete "1" and insert -- 1, --, therefor.

In column 9, line 29, in Claim 13, delete "dine" and insert -- time --, therefor.

Signed and Sealed this

Thirtieth Day of March, 2010

David J. Kappos
*Director of the United States Patent and Trademark Office*